US012233895B2

(12) United States Patent
Andreetto et al.

(10) Patent No.: US 12,233,895 B2
(45) Date of Patent: Feb. 25, 2025

(54) MOTOR-VEHICLE DRIVING ASSISTANCE IN LOW METEOROLOGICAL VISIBILITY CONDITIONS, IN PARTICULAR WITH FOG

(71) Applicant: C.R.F. SOCIETA' CONSORTILE PER AZIONI, Orbassano (IT)

(72) Inventors: Marco Andreetto, Orbassano (IT); Nereo Pallaro, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 178 days.

(21) Appl. No.: 17/924,378

(22) PCT Filed: May 12, 2021

(86) PCT No.: PCT/IB2021/054035
§ 371 (c)(1),
(2) Date: Nov. 10, 2022

(87) PCT Pub. No.: WO2021/229458
PCT Pub. Date: Nov. 18, 2021

(65) Prior Publication Data
US 2023/0174091 A1 Jun. 8, 2023

(30) Foreign Application Priority Data
May 12, 2020 (IT) ................. 102020000010762

(51) Int. Cl.
*B60W 50/14* (2020.01)
*B60Q 1/14* (2006.01)
(Continued)

(52) U.S. Cl.
CPC ............ *B60W 50/14* (2013.01); *B60Q 1/143* (2013.01); *B60W 30/146* (2013.01); *G06T 11/00* (2013.01);
(Continued)

(58) Field of Classification Search
CPC ............. B60W 50/14; B60W 30/146; B60W 2050/146; B60W 2420/40;
(Continued)

(56) References Cited

U.S. PATENT DOCUMENTS 7,834,905 B2 * 11/2010 Hahn ..................... B60R 1/30
250/252.1
8,977,008 B2 * 3/2015 Camilleri ................. B60R 1/28
348/904
(Continued)

FOREIGN PATENT DOCUMENTS

DE 102016014549 A1 7/2017
GB 2401270 A * 11/2004 ............... B60R 1/00
(Continued)

OTHER PUBLICATIONS

International Search Report and Written Opinion of the ISA issued in PCT/IB2021/054035, mailed Oct. 22, 2021; ISA/EP.
(Continued)

*Primary Examiner* — Aaron L Troost (57) ABSTRACT

An advanced driver assistance system (ADAS) configured to assist a driver in low visibility conditions. The ADAS controls operation of one or more automotive systems including an external lighting system, an automotive user interface, and an automotive cruise control system based on the visibility in front of the vehicle. The ADAS system visually assists the driver via an automotive user interface by displaying a streaming video of one or more first front cameras configured to operate in a spectrum visible to the human eye, one or more second cameras configured to operate in a spectrum invisible to the human eye, or a virtual depiction of an environment in front of or surrounding the motor vehicle based on information from an automotive sensory system.

9 Claims, 3 Drawing Sheets

(51) Int. Cl.
*B60Q 1/20* (2006.01)
*B60W 30/14* (2006.01)
*G06T 11/00* (2006.01)
*G06V 20/56* (2022.01)
*H04N 7/18* (2006.01)
*H04N 23/20* (2023.01)

(52) U.S. Cl.
CPC ............ *G06V 20/56* (2022.01); *H04N 7/181* (2013.01); *B60Q 1/20* (2013.01); *B60W 2050/146* (2013.01); *B60W 2420/40* (2013.01); *B60W 2420/403* (2013.01); *B60W 2552/50* (2020.02); *B60W 2552/53* (2020.02); *B60W 2555/20* (2020.02); *H04N 23/20* (2023.01)

(58) Field of Classification Search
CPC ....... B60W 2420/403; B60W 2552/50; B60W 2552/53; B60W 2555/20; B60W 30/182; B60Q 1/143; B60Q 1/20; G06T 11/00; G06V 20/56; H04N 7/181; H04N 23/20; H04N 23/10; H04N 23/11; H04N 23/13; B60K 2360/176; B60K 2360/177; B60K 2360/1868; B60K 2360/191; B60K 2360/48; B60K 35/00; B60K 35/23; B60K 35/28; B60K 35/29; B60R 1/30

See application file for complete search history.

(56) References Cited

U.S. PATENT DOCUMENTS

| | | | |
|---|---|---|---|
| 2006/0006331 A1* | 1/2006 | Adamietz | H04N 23/20 348/E5.09 |
| 2009/0002141 A1* | 1/2009 | Rinaldi | B60R 1/30 340/425.5 |
| 2013/0103257 A1* | 4/2013 | Almedia | B60Q 1/303 701/36 |
| 2013/0229513 A1* | 9/2013 | Ichitani | H04N 23/11 348/135 |
| 2014/0093131 A1* | 4/2014 | Fan | G06V 20/20 382/104 |
| 2016/0288644 A1 | 10/2016 | Bochenek et al. | |
| 2017/0220875 A1* | 8/2017 | Jeromin | H04N 13/254 |
| 2019/0161010 A1 | 5/2019 | Repale et al. | |
| 2019/0291658 A1 | 9/2019 | Bingle et al. | |
| 2020/0226393 A1 | 7/2020 | Han | |
| 2021/0061184 A1* | 3/2021 | Weinlich | B60W 50/14 |

FOREIGN PATENT DOCUMENTS

| | | |
|---|---|---|
| KR | 20190067366 A | 6/2019 |
| WO | WO-2018211354 A1 | 11/2018 |
| WO | WO-2019138301 A1 | 7/2019 |
| WO | WO-2019155435 A2 | 8/2019 |

OTHER PUBLICATIONS

International Preliminary Report on Patentability issued in PCT/IB2021/054035, mailed Aug. 2, 2022.
Written Opinion of the International Preliminary Examining Authority issued in PCT/IB2021/054035, mailed Apr. 29, 2022.

* cited by examiner

MOTOR-VEHICLE DRIVING ASSISTANCE IN LOW METEOROLOGICAL VISIBILITY CONDITIONS, IN PARTICULAR WITH FOG

CROSS REFERENCE TO RELATED APPLICATIONS

This patent application is a U.S. National Phase Application under 35 U.S.C. 371 of International Application No. PCT/IB2021/054035, filed on May 12, 2021, which claims the benefit of Italian patent application No. 102020000010762 filed on May 12, 2020. The entire disclosures of the above identified applications are incorporated herein by reference.

TECHNICAL FIELD OF THE INVENTION

The present invention relates to motor-vehicle driving assistance in low meteorological visibility conditions, in particular with fog.

The present invention is applicable to any type of road vehicle, whether for the transport of persons or goods.

BACKGROUND OF THE INVENTION

As is known, in recent years car manufacturers have invested considerable resources in the search for advanced driver assistance systems (ADAS) in order to improve safety and driving comfort.

For this reason, and as they will help achieve the targets imposed by the EU for reducing road accidents, ADAS are one of the fastest growing segments in the automotive sector and are set to become increasingly popular in the coming years.

The safety features of these systems are designed to prevent collisions and accidents, provide technologies that warn drivers of potential issues, or to avoid collisions by implementing safeguard measures and by taking control of motor-vehicles. Adaptive features can automate lighting, provide adaptive cruise speed control, automate braking, incorporate GPS/traffic alerts, connect smartphones, alert drivers of other motor-vehicles to dangers, keep drivers in the correct lane, or show what is in the blind spots.

ADAS technology is based on vision/camera systems, sensory systems, automotive data networks, Vehicle-to-Vehicle (V2V) or Vehicle-to-Infrastructure (V2I) communication systems. Next-generation ADAS systems will increasingly take advantage of wireless connectivity to add value to V2V or V2I communication.

Technological developments such as the integration of radars and cameras, and the fusion of sensors among multiple applications, are expected to result in a reduction in costs that could lead to a more significant penetration of ADAS into the market of compact motor-vehicles. The end point of these technological developments is usually referred to as self-driving or driverless motor-vehicles or autonomous motor-vehicles.

Camera-based ADAS are a key component for further improvements in safety and driving comfort. While image sensors work well in good meteorological conditions, their efficiency suffers from adverse environmental influences such as heavy rain, fog or snow.

DE 10 2016 014 549 A1 discloses a method for determining the visual radius from a vehicle by means of a lidar sensor, based on which motor-vehicle functions are then controlled. The method includes activating at least one display function for displaying the detected visual range and/or a maximum sensible speed determined according to the detected visual range. In addition or as an alternative, the activation of a lighting function may be provided which adapts the wavelength at least of the front lighting and/or the light distribution based on the determined field of view.

US 2019/161010 A1 discloses a display arrangement for a motor-vehicle comprising a camera for capturing images of a scene in front of the motor-vehicle. The camera transmits first video signals indicative of the captured images. A video processor is communicatively coupled to the camera and receives the first video signals. The video processor processes the first video signals to make the objects in the first video signals easier to see, thus producing second video signals. The video processor transmits the second video signals. A head-up display system is communicatively coupled to the video processor to receive the second video signals. The head-up display system lights up an illuminable area of the motor-vehicle windscreen so that the lighting is visible to the driver of the motor-vehicle in the form of a virtual image. The illuminable area of the windscreen depends on the second video signals.

US 2020/226393 A1 discloses a motor-vehicle comprising a camera; a memory in which a plurality of reference images and position information corresponding to the respective plurality of reference images are stored; and a processor which acquires via the camera an image of the environment surrounding the motor-vehicle, acquires a reference image corresponding to the current position of the motor-vehicle among the plurality of reference images if the visibility of the image of the environment surrounding the motor-vehicle satisfies a predetermined condition, acquires an image in which the image of the environment surrounding the motor-vehicle and the reference image are combined, and controls the operation of the motor-vehicle based on the combined image.

WO 2018/211354 A1 discloses focal plane arrays (FPAs) of plasmonically enhanced silicon pyramid Schottky photodetectors operating in the short-wave infrared (SWIR) range and imaging systems that combine such FPAs with active lighting sources and a readout integrated circuit. Such imaging systems enable imaging in the SWIR range using inexpensive silicon detector arrays, particularly in vehicular environments where such an imaging system can be mounted on a motor-vehicle and display various moving and fixed targets.

OBJECT AND SUMMARY OF THE INVENTION

The Applicant has found that the ADASes currently on the market, although satisfactory in many respects, still have significant room for improvement, in particular in terms of the assistance they are able to provide to motor-vehicle drivers in low meteorological visibility conditions, in particular with fog.

Aim of the present invention is therefore to provide an ADAS capable of assisting motor-vehicle drivers in low meteorological visibility conditions, in particular with fog.

According to the present invention, an advanced driver assistance system to assist motor-vehicle drivers in low meteorological visibility conditions, in particular with fog, is provided, as claimed in the appended claims.

DETAILED DESCRIPTION OF PREFERRED EMBODIMENTS OF THE INVENTION

The present invention will now be described in detail with reference to the accompanying drawings to enable a skilled person to realize and use it. Various modifications to the embodiments presented shall be immediately clear to persons skilled in the art and the general principles disclosed herein could be applied to other embodiments and applications but without thereby departing from the scope of protection of the present invention as defined in the appended claims. Therefore, the present invention should not be considered limited to the embodiments described and shown, but should be granted the widest protective scope in accordance with the features described and claimed.

Where not otherwise defined, all the technical and scientific terms used herein have the same meaning commonly used by persons of ordinary skill in the field pertaining to the present invention. In the event of a conflict, this description, including the definitions provided, shall be binding. Furthermore, the examples are provided for illustrative purposes only and as such should not be considered limiting.

In particular, the block diagrams included in the accompanying figures and described below are not to be understood as a representation of the structural characteristics, or constructive limitations, but must be interpreted as a representation of functional characteristics, properties that is, intrinsic properties of the devices and defined by the effects obtained or functional limitations that can be implemented in different ways, therefore in order to protect the functionalities thereof (possibility of functioning).

In order to facilitate understanding of the embodiments described herein, reference will be made to some specific embodiments and a specific language will be used to describe them. The terminology used herein is for the purpose of describing only particular embodiments, and is not intended to limit the scope of the present invention.

Figure 1:
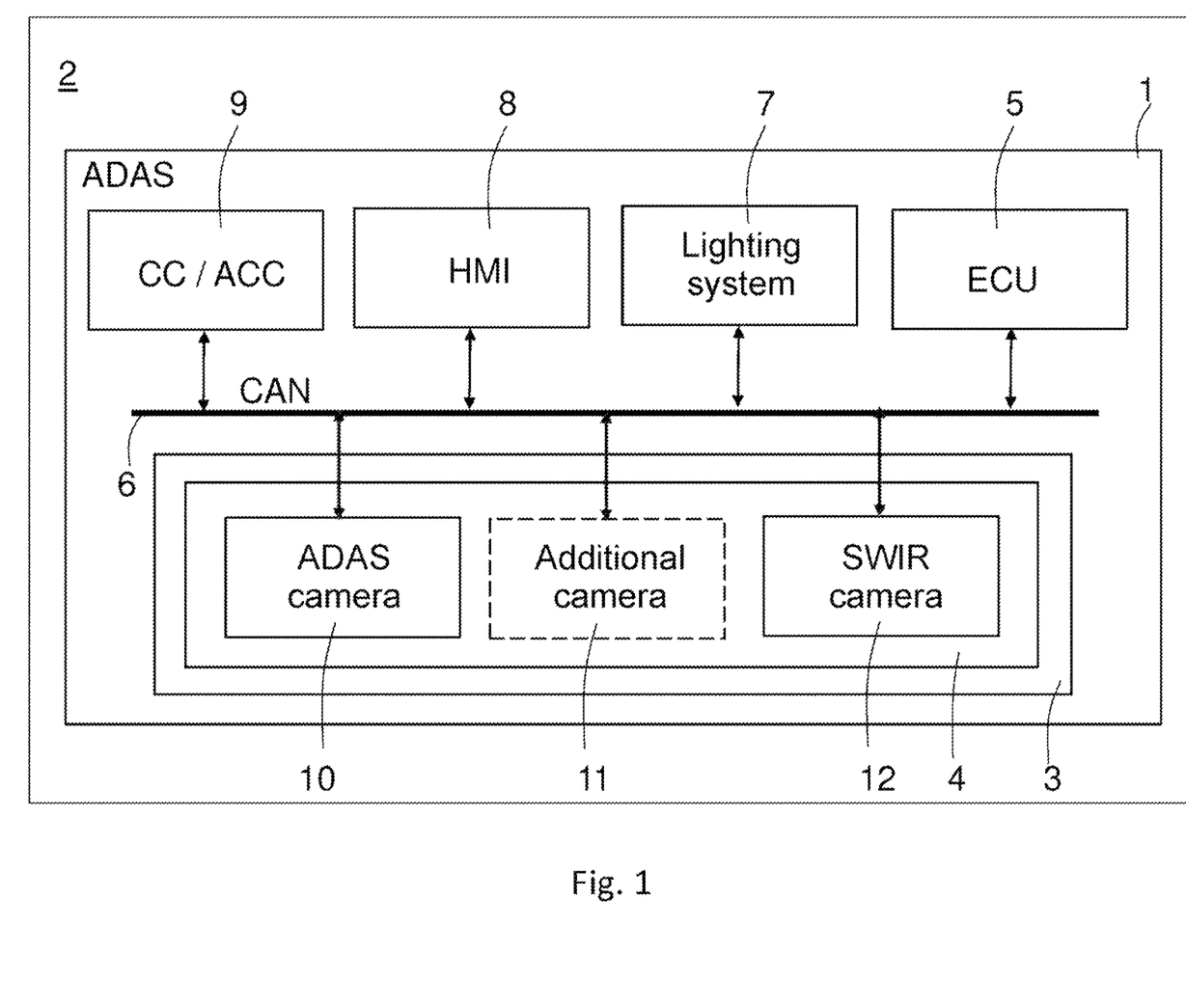
FIG. 1 shows a block diagram of an ADAS capable of assisting motor-vehicle drivers in low meteorological visibility conditions, in particular with fog.

FIG. 1 shows a block diagram of a basic embodiment of an ADAS 1 capable of assisting a driver of a motor-vehicle 2 in low meteorological visibility conditions, in particular with fog, to which the following description will refer without losing its generality.

The ADAS 1 comprises:
- an automotive sensory system 3 comprising, but not limited to, an automotive front (or forward-looking or forward-facing) vision system 4 arranged to monitor the environment in front of the motor-vehicle 2; and
- an automotive electronic control unit (ECU) 5 configured to communicate, via an automotive on-board communication network 6, e.g., CAN, FlexRAy or others, with the automotive sensory system 3, as well as with other automotive systems of the motor-vehicle 2, directly or indirectly, i.e., via dedicated electronic control units, and to assist the driver of the motor-vehicle 2 in low meteorological visibility conditions, in particular with fog.

As far as the present invention is concerned, the ECU 5 is configured to communicate and cooperate with automotive systems comprising an automotive external lighting system 7, which comprises, as is known, front-lights such as position, low beam, high beam and fog lights, and tail-lights such as position and rear fog lights; an automotive user interface 8 comprising, but not limited to, one or different displays, for example, a head unit display of an infotainment system, a head-up display, etc.; and a cruise control system 9, which, depending on the equipment of the motor-vehicle 2, may be in the form of a non-adaptive Cruise Control (CC), also known as Tempomat, or an Adaptive Cruise Control (ACC).

The automotive front vision system 3 comprises a normal production ADAS camera 10, i.e., of the type traditionally used in ADASes currently on the market, which, depending on the normal production equipment of the motor-vehicle 2, may be in the form of a low-resolution, black and white camera to allow implementation of both camera-based ADAS functions and a motor-vehicle driver assistance function in low meteorological visibility conditions according to an embodiment of the invention that will be described herein below, or a high-resolution colour camera to allow implementation of both camera-based ADAS functions and a motor-vehicle driver assistance function in low meteorological visibility conditions according to a different embodiment of the invention that will be described hereinbelow.

When the normal production ADAS camera 10 is not of the type designed to output a video streaming, for example because it is of the low-resolution, black and white type, the automotive front vision system 4 further comprises an additional camera 11 of the type designed to operate in the electromagnetic spectrum visible to the human eye to output a video streaming, for example of the high-resolution colour type, to allow implementation of the motor-vehicle driver assistance function in low meteorological visibility conditions according to a different embodiment of the invention that will be described hereinbelow.

The ADAS camera 10 incorporates a dedicated electronic digital image processor capable of performing several simultaneous processing operations on the captured digital images to implement different applications, such as lane recognition, moving and approaching motor-vehicle detection, motor-vehicle external lighting distribution control, preceding or leading motor-vehicle detection, pedestrian detection, traffic sign recognition, etc.

For the implementation of some embodiments of the invention, the electronic digital image processor of the ADAS camera 10, in case it is designed to output a video streaming, or that of the additional camera 11, in case the ADAS camera 10 is not designed to output a video streaming, is first designed to output a video streaming formed by a sequence of digital images captured in the visible spectrum.

The electronic digital image processor of the ADAS camera 10 is also designed to process the captured digital images to estimate the day and night meteorological visibilities in front of the motor-vehicle 2, which, as is known, represent the maximum horizontal distances at which a non-luminous and, respectively, luminous object is visible and recognizable against the background, to classify the visibilities into one of several classes or categories of meteorological visibilities based on a classification criterion, and to output, in addition to the video streaming formed by the sequence of captured digital images, also meteorological visibility data indicative of the level of meteorological visibility in front of the motor-vehicle 2.

In one embodiment, the electronic digital image processor of the ADAS camera 10, whether it is a low-resolution black and white camera or a high-resolution colour camera, and/or the electronic digital image processor of the additional camera 11 is further designed to process the captured digital images to recognize features such as lane markers, guardrails, obstacles, motor-vehicles and vulnerable road users and to output augmented reality data representative of the recognised elements.

In a different embodiment, the processing of digital images captured by the ADAS camera 10 and/or the additional camera 11 for the purposes of recognising road elements such as lane markers, guardrails, obstacles, motor-vehicles and vulnerable road users, and of providing augmented reality data representative of the recognised road elements, is delegated to electronic processing resources external to the ADAS camera 10 and the additional camera 11, for example to a central processing node of the motor-vehicle 2 dedicated to processing the digital images captured by all the on-board cameras of the motor-vehicle 2.

In a different embodiment, the automotive front vision system 4 could further comprise an additional front camera 12 designed to operate in the electromagnetic spectrum invisible to the human eye, in particular in the infrared spectrum, to capture digital images of the environment in front of the motor-vehicle 2 and to output a video streaming formed by a sequence of digital images captured in the infrared spectrum in which it is designed to operate.

In one embodiment, this additional front camera 12 may be in the form of a Near-InfraRed (NIR) camera, hereinafter briefly referred to as NIR camera 12.

In a different embodiment, this additional front camera 12 may conveniently be in the form of a Short-Wavelength InfraRed (SWIR) camera, hereinafter briefly referred to as SWIR camera 12.

A further embodiment, both NIR and SWIR cameras 12 may be provided for use in different operational contexts, particularly in the presence of different meteorological visibility ranges in front of the motor-vehicle 2, as clarified later on.

The NIR and SWIR cameras 12 are digital image sensors designed to operate in the relevant infrared spectra and integrating respective dedicated electronic digital image processors designed to perform several simultaneous processing operations on the captured digital images to implement different applications, including, but not limited to, lane recognition, obstacle recognition, and other recognitions even in low meteorological visibility conditions and in particular with light fog or thick fog.

In order to enable correct operation of the NIR and/or SWIR cameras 12, the automotive front vision system 4 further comprises one and/or different optical illuminators (not shown) operable to light the environment in the electromagnetic spectra in which the NIR and/or SWIR cameras 12 are designed to operate.

In the example considered, the automotive front vision system 4 comprises a NIR illuminator for the NIR camera and a SWIR illuminator for the SWIR camera.

The optical illuminators may be integrated in the corresponding NIR and SWIR cameras or in the front lights of the motor-vehicle 2.

As far as the present invention is concerned, the electronic digital image processors of the NIR/SWIR cameras 12 are further designed to process the captured digital images to recognise road elements such as lane markers, guardrails, obstacles, motor-vehicles and vulnerable road users and to output, in addition to the video streaming formed by the sequence of captured digital images, augmented reality data representative of the recognised elements.

In a different embodiment, recognition of road elements such as lane markers, guardrails, obstacles, motor-vehicles and vulnerable road users may be delegated to electronic processing resources external to the NIR and SWIR cameras 11, 12 of the automotive front vision system 4, for example to a central processing node of the motor-vehicle 2 dedicated to processing the digital images captured by all the on-board cameras of the motor-vehicle 2, which may be programmed to recognise these road elements based on the output of one or different other sensors of the automotive sensory system 3 that are unaffected or are only slightly affected by fog, mainly a radar, and which may hence allow road elements that are undetectable based on the digital images provided by the automotive front vision system 4 to be instead recognised, and output augmented reality data representative of the recognised road elements.

As far as the SWIR camera 12 is concerned, it is conveniently, but not necessarily, of the type described in WO 2018/211354 A1, WO 2019/138301 A1, and WO 2019/155435 A1, to TRIEYE LTD.

In one embodiment, the electronic digital image processor of the ADAS camera 10 is designed to process the captured digital images to classify the meteorological visibility in the processed digital images into the following two meteorological visibility ranges and to output meteorological visibility data indicative of the meteorological visibility range in front of the motor-vehicle 2:

good meteorological visibility: the meteorological visibility is above a meteorological visibility threshold, e.g., 100 metres, and low meteorological visibility: the meteorological visibility is below a meteorological visibility threshold, which is conveniently identical to, but may also be different from (hysteresis), that used to determine the good meteorological visibility.

With fog, the two above-indicated meteorological visibility ranges correspond to absence of fog and presence of fog, respectively.

Furthermore, in order to avoid a phenomenon known as "chattering", the electronic digital image processor of the ADAS camera 10 is conveniently designed to pass from one meteorological visibility range to another only after the meteorological visibility conditions of the new meteorological visibility range are occurring for a certain period of time or hysteresis, for example 5 seconds.

In a different embodiment, classification of the meteorological visibility may be delegated to electronic processing resources external to the front cameras 10, 11, 12 of the automotive front vision system 4, for example to a central processing node of the motor-vehicle 2 dedicated to processing the digital images captured by all the on-board cameras of the motor-vehicle 2, which may be programmed to classify the meteorological visibility into the above-indicated two meteorological visibility ranges based on the digital images captured by one of the front cameras 10, 11, 12 of the automotive front vision system 4 or based on the comparison of the digital images captured by two or more of the front cameras 10, 11, 12 of the automotive front vision system 4.

The ECU 5 is further programmed to assist the driver of the motor-vehicle 2 by implementing the operations described hereinbelow with reference to the flowchart shown in FIG. 2.

Figure 2:
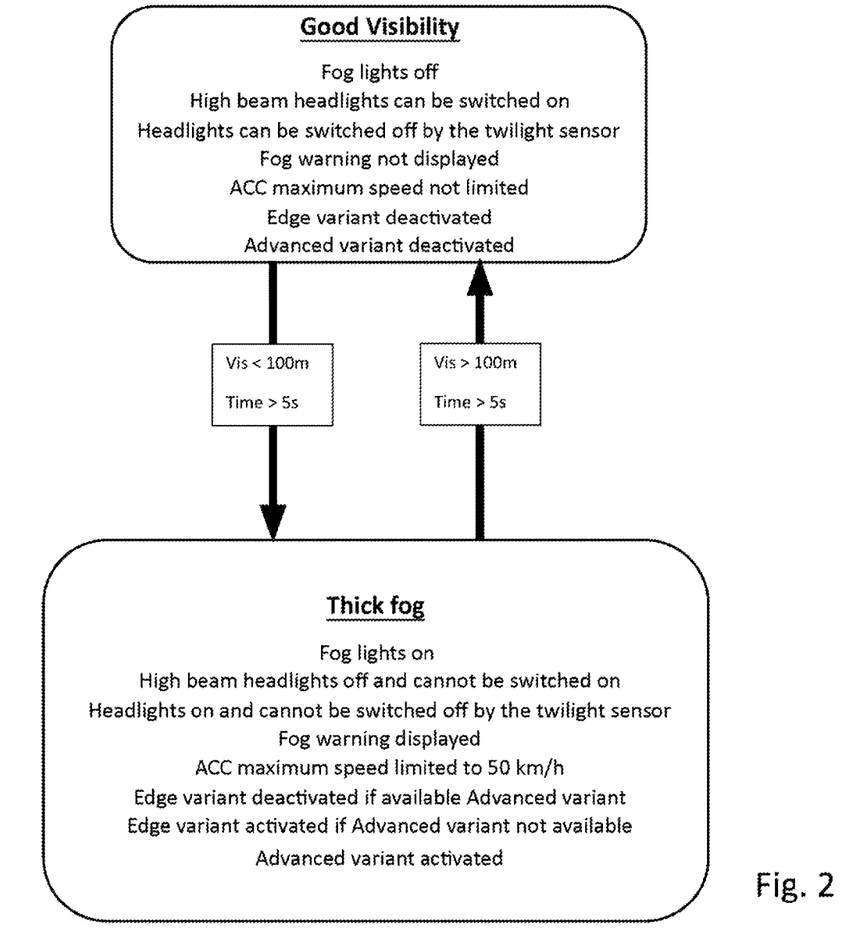
FIGS. 2 and 3 show flow diagrams of operations performed by the ADAS of FIG. 1 in different embodiments of the invention.

As shown in FIG. 2, the ECU 5 is programmed to:
receive meteorological visibility data, augmented reality data, and video streaming(s) from one or more of the front cameras 10, 11, 12 of the automotive front vision system 4,
assist the driver of the motor-vehicle 2 according to a normal driver assistance mode if the received meteorological visibility data is indicative of a good meteorological visibility in front of the motor-vehicle 2, and assist the driver of the motor-vehicle 2 according to an advanced driver assistance mode if the received meteorological visibility data is indicative of a low meteorological visibility in front of the motor-vehicle 2.

In the normal driver assistance mode, the ECU 5 is programmed to:
switch off the front and rear fog lights,
enable manual or automatic switching on of the high beam headlights.
enable automatic switching on of the low beam headlights based on the external light conditions detected by a twilight sensor of the motor-vehicle 2,
interrupt any previous visual/acoustic/aptic warning of a low meteorological visibility to the driver, and
remove any limitation to the user-settable cruise speed of n the CC or ACC.

In the advanced driver assistance mode, the ECU 5 is programmed to:
switch on the front and rear fog lights.
switch off the high beam headlights and disable automatic switching on thereof,
switch on the low beam headlights and disable automatic switching off thereof based on the external light conditions detected by the twilight sensor,
provide a visual/acoustic/aptic warning of a low meteorological visibility to the driver, and
limit the maximum user-settable cruise speed of the CC or ACC so that a safety cruise speed cannot be exceeded, which can be computed by the ECU 5 based on the meteorological visibility detected in the digital images processed or be stored in a calibration phase of the ADAS 1 and equal to a maximum driving speed provided for by the in-force road regulations for the type of road travelled by the motor-vehicle 2 and in foggy conditions and specified in the Highway Code, for example 50 km/h on an Italian motorway.

In the advanced driver assistance mode, the ECU 5 is further programmed to cause a display of the motor-vehicle 2, such as the head unit display of the infotainment system or the head-up display, if the motor-vehicle 2 is so equipped, to display one of the video streamings of one of the front cameras 10, 11, 12 of the automotive front vision system 4, in particular the video streaming of the ADAS camera 10, if it is of the high-resolution colour type, or the video streaming of the additional camera 11, if the ADAS camera 10 is of the low-resolution black and white type, or even the video streaming of the NIR camera or of the SWIR camera 12, if the motor-vehicle 2 is so equipped, according to a proprietary criterion. e.g., based on information from the automotive sensory system 3.

The ECU 5 is further conveniently programmed to enrich the displayed video streaming based on the received augmented reality data to enhance the driver's perception of the scene by depicting the elements recognised in the processed digital images, and in particular road sides, lane markers, guardrails, obstacles, other motor-vehicles, and vulnerable road users.

The ECU 5 may be conveniently further programmed to further enrich the displayed video streaming based on data from one or different other sensors of the automotive sensory system 3 that are unaffected or are only slightly affected by fog, mainly a radar, and which may hence allow obstacles that are undetectable based on the digital images from the front cameras 10, 11, 12 of the automotive front vision system 4 to be instead recognised.

The ECU 5 may also be conveniently further programmed to further enrich the displayed video streaming based on data contained in stored high-definition digital road maps, which may, for example, enable curves or lane markers to be more precisely identified.

The ECU 5 is further conveniently programmed to further enhance the displayed video streaming of the ADAS camera 10, if it is of the high-resolution colour type, or the displayed video streaming of the additional camera 11, if the ADAS camera 10 is of the low-resolution black and white type, by implementing so-called de-hazing digital image processing techniques (e.g., to restore contrast, namely to reduce the so-called "fog effect" in digital images).

In a different embodiment, in the advanced driver assistance mode the ECU 5 may be further programmed to cause a display of the motor-vehicle 2 to display, instead of one of the video streamings of one of the front cameras 10, 11, 12 of the automotive front vision system 4, a virtual depiction of the environment in front of or surrounding the motor-vehicle 2 (road, guardrail, obstacles, etc.) computed based on information from the automotive sensory system 3, and in particular from those sensors that are unaffected by fog, mainly a radar.

In the advanced driver assistance mode, the ECU 5 is further conveniently programmed to guarantee the safety of the passengers of the motor-vehicle 2 by implementing interventions to cause the driving speed of the motor-vehicle 2 not to exceed a safe driving speed, which can be computed by the ECU 5 based on the meteorological visibility detected in the digital images processed or be stored in a calibration phase of the ADAS 1 and equal to a maximum driving speed provided for by the in-force road regulations for the type of road travelled by the motor-vehicle 2 and in foggy conditions and specified in the Highway Code, for example 50 km/h on an Italian motorway.

In particular, to guarantee that the driving speed of the motor-vehicle 2 does not exceed a safe driving speed, the ECU 5 may conveniently be programmed to implement one or both of the following actions:
recommending the driver to adopt a safety driving speed by visually/acoustically/aptically requesting the driver via the automotive user interface of the motor-vehicle 2 to appropriately intervene on controls of the motor-vehicle 2, in particular a brake pedal, and
intervening directly on automotive systems of the motor-vehicle 2, in particular a braking system.

In the advanced driver assistance mode, the ECU 5 is further conveniently programmed to guarantee safety of the passengers of the motor-vehicle 2 by selectively and appropriately disabling other ADAS functions based on the ADAS camera 10 and including, but not limited to, lane keeping, lane centering, lane departure warning, ACC, etc., based on proprietary logics that may differ for different automotive manufacturers and that also takes into account recommendations of the manufacturers of the ADAS camera 10.

In a different embodiment, in which the automotive front vision system 4 comprises both either an ADAS camera 10 or an additional high-resolution colour camera 11 outputting a video streaming formed by the digital images captured in the visible spectrum, and an NIR camera and/or a SWIR camera 12 outputting respective video streamings formed by the sequence of digital images captured in the relevant infrared spectra, the electronic digital image processor of the ADAS camera 10 may be designed to process the captured digital images to classify the meteorological visibility in the processed digital images into the following three meteorological visibility ranges and to output meteorological visibility data indicative of the meteorological visibility range in front of the motor-vehicle 2:

- good meteorological visibility: the meteorological visibility is above a higher threshold, e.g. 1000 metres,
- intermediate meteorological visibility: the meteorological visibility is between a higher meteorological visibility threshold, which is conveniently identical to, but may also be different from (hysteresis), that used to determine the good meteorological visibility, and a lower meteorological visibility threshold, e.g., between 1000 metres and 100 metres, and
- low meteorological visibility: the meteorological visibility is below a lower visibility threshold, which is conveniently identical to, but may also be different from (hysteresis), that used to determine the intermediate meteorological visibility, e.g., below 100 metres.

With fog, the above-indicated three meteorological visibility ranges correspond to absence of fog, light fog and thick fog, respectively.

Also in this embodiment, classification of the meteorological visibility based on the digital images may be delegated to electronic processing resources external to the front cameras 10, 11, 12 of the automotive front vision system 4, for example to a central processing node of the motor-vehicle 2 dedicated to processing the digital images captured by all the on-board cameras of the motor-vehicle 2, which may be programmed to classify the meteorological visibility into the above-indicated three meteorological visibility ranges based on the digital images captured by one of the front cameras 10, 11, 12 of the automotive front vision system 4 or based on the comparison of the digital images captured by two or more of the front cameras 10, 11, 12 of the automotive front vision system 4.

The ECU 5 is further programmed to assist the driver of the motor-vehicle 2 by implementing the operations described below with reference to the flowchart shown in FIG. 3.

Figure 3:
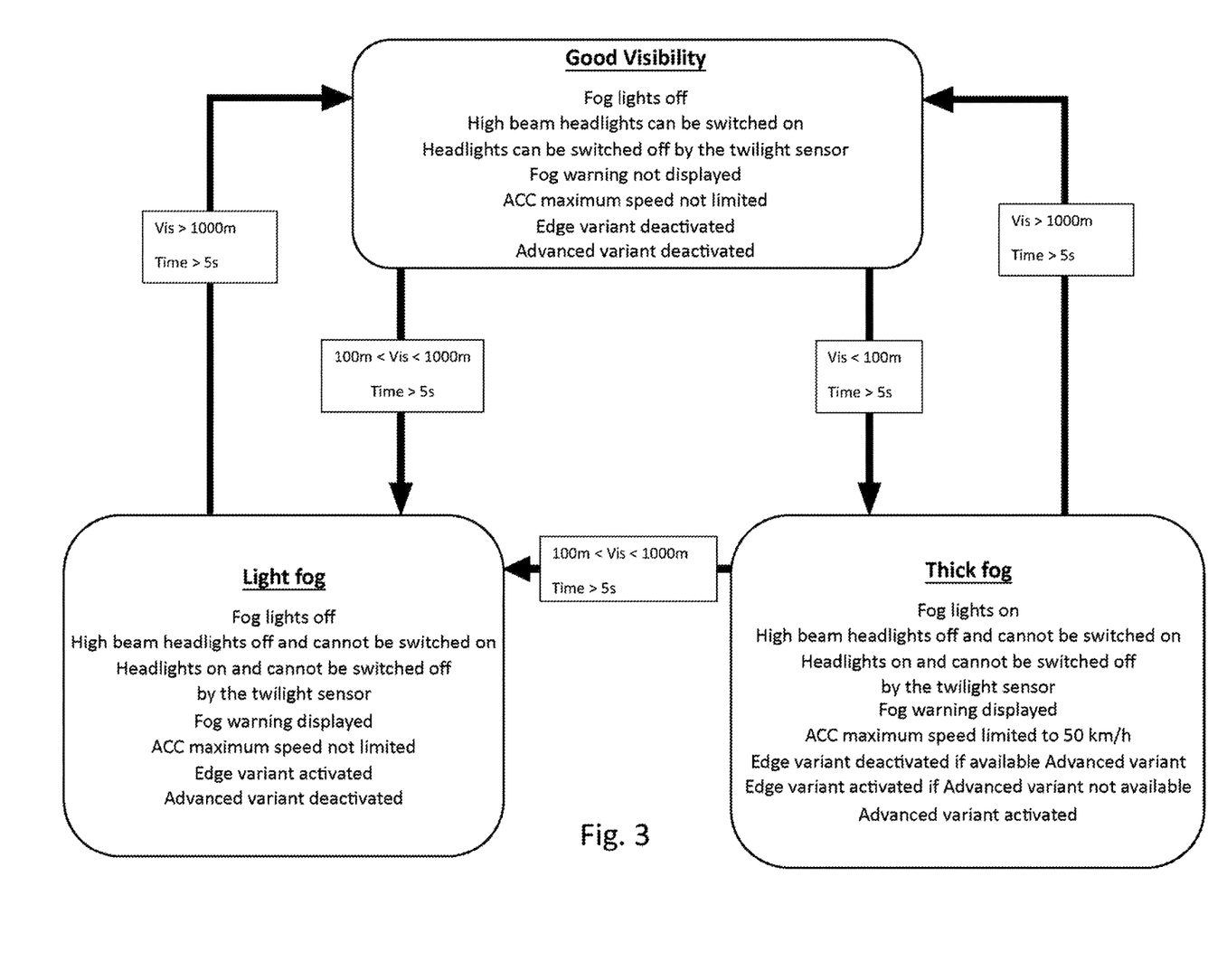

As shown in FIG. 3, the ECU 5 is programmed to:
- receive meteorological visibility data, augmented reality data, and video streamings of the automotive front vision system 4,
- assist the driver of the motor-vehicle 2 according to a normal driver assistance mode if the received meteorological visibility data is indicative of a good meteorological visibility in front of the motor-vehicle 2;
- assist the driver of the motor-vehicle 2 according to an intermediate driver assistance mode, if the received meteorological visibility data is indicative of an intermediate meteorological visibility in front of the motor-vehicle 2; and
- assist the driver of the motor-vehicle 2 according to an advanced driver assistance mode, if the received meteorological visibility data is indicative of a low meteorological visibility in front of the motor-vehicle 2.

In the normal driver assistance mode, the ECU 5 is programmed to:
- switch off the front and rear fog lights,
- enable manual or automatic switching on of the high beam headlights,
- enable automatic switching on of the low beam headlights based on external light conditions detected by a twilight sensor of the motor-vehicle 2.
- interrupt any previous visual/acoustic/aptic warning of a low meteorological visibility to the driver, and
- remove any limitation to the user-settable cruising speed of the CC or ACC.

In the intermediate driver assistance mode, the ECU 5 is programmed to:
- switch off the front and rear fog lights,
- switch off the high beam headlights and disable automatic switching on thereof, e.g., by ADAS camera 10,
- switch on the low beam headlights and disable automatic switching off thereof based on external light conditions detected by the twilight sensor.
- provide a visual/acoustic/aptic warning of a low meteorological visibility to the driver, and
- remove any limitation to the user-settable cruise speed of the CC or ACC.

In the advanced driver assistance mode, the ECU 5 is programmed to:
- switch on the front and rear fog lights,
- switch off the high beam headlights and disable automatic switching on thereof,
- switch on the low beam headlights and disable automatic switching off thereof based on external light conditions detected by the twilight sensor,
- provide a visual/acoustic/aptic warning of a low meteorological visibility to the driver, and
- limit the maximum user-settable cruising speed of the CC or ACC so that a safety cruise speed cannot be exceeded, which may be computed by the ECU 5 based on the meteorological visibility detected in the digital images processed or be stored in a calibration phase of the ADAS 1 and equal to a maximum driving speed provided for by the in-force road regulations for the type of road travelled by the motor-vehicle 2 and in foggy conditions and specified in the Highway Code, for example 50 km/h on an Italian motorway.

In the intermediate assistance mode, the ECU 5 is also programmed to cause to be displayed on a display of the motor-vehicle, for example the info entertainment system (head unit display) or the head-up display, if equipped, the video streaming of the ADAS camera 10, if it is of the high resolution colour type, or of the additional camera 11, if the ADAS camera 10 is of the low resolution black and white type. In the intermediate driver assistance mode, the ECU 5 is further conveniently programmed to further improve the displayed video streaming by implementing so-called de-hazing digital image processing techniques (e.g., to restore contrast, namely to reduce the so-called 'fog effect' in the digital images). The highlighted elements may be identified using other sensors of the motor-vehicle 2.

In the advanced diver assistance mode, the ECU 5 is further programmed to cause the video streaming of the NIR camera or the SWIR camera 12 to be displayed on a display of the motor-vehicle 2, for example the head unit display of the infotainment system or the head-up display, if the motor-vehicle 2 is so equipped.

In the intermediate and advanced driver assistance modes, the ECU 5 is further conveniently programmed to enrich the displayed video streamings based on the received augmented reality data to enhance the driver's perception of the scene by depicting the elements recognised in the processed digital images, and in particular road sides, lane markers, guardrails, obstacles, other motor-vehicles, and vulnerable road users.

The ECU 5 may be conveniently further programmed to further enrich the displayed video streaming based on data from one or different other sensors of the automotive sensory system 3 that are unaffected or are only slightly affected by fog, mainly a radar, and which may hence allow obstacles that are undetectable based on the digital images from the automotive front vision system 4 to be recognised.

The ECU 5 may be conveniently further programmed to further enrich the displayed video streaming based on data contained in stored high-definition digital road maps, which may, for example, enable curves or lane markers to be more precisely identified.

In a further embodiment both the NIR camera and the SWIR camera may be used, the video streamings of which are displayed in the advanced driver assistance mode depending on the meteorological visibility range in front of the motor-vehicle 2.

By way of a non-limiting example, the video streaming of the SWIR camera could be displayed in low to medium meteorological visibility conditions, e.g., between 30 metres and 50 metres, while video streaming of the NIR camera could be displayed in medium to high meteorological visibility conditions, e.g., between 50 metres and 80 metres. In a different embodiment, both in the intermediate driver assistance mode and in the advanced driver assistance mode, the ECU 5 may be further programmed to cause a display of the motor-vehicle 2 to display, instead of the video streamings of the automotive front vision system 4, a virtual depiction of the environment in front of or surrounding the motor-vehicle 2 (road, guardrails, obstacles, etc.) computed based on information from the automotive sensory system 3, and in particular from those sensors that are unaffected by fog, mainly a radar.

In both the intermediate driver assistance mode and in the advanced driver assistance mode, the ECU 5 is conveniently further programmed to guarantee safety of the passengers of the motor-vehicle 2 by implementing interventions to cause the driving speed of the motor-vehicle 2 not to exceed a safe driving speed, which may be conveniently equal to the safe cruise speed to which the user-settable cruise speed of the CC or ACC is limited.

In particular, to guarantee that the driving speed of the motor-vehicle 2 does not exceed a safe driving speed, the ECU 5 may be conveniently further programmed to implement one or both of the following actions:

recommending the driver to adopt a safety driving speed by visually/acoustically/aptically requesting the driver via the automotive user interface of the motor-vehicle 2 to appropriately intervene on controls of the motor-vehicle 2, in particular a brake pedal, and intervening directly on automotive systems of the motor-vehicle 2, in particular a braking system.

Both in the intermediate driver assistance mode and in the advanced driver assistance mode, the ECU 5 is conveniently further programmed to guarantee safety of the passengers of the motor-vehicle 2 by selectively and appropriately disabling other ADAS functions based on the ADAS camera 10 and comprising, but not limited to, lane keeping, lane centering, lane departure warning, ACC, etc., based on proprietary logic that may differ for different automotive manufacturers and that also takes into account recommendations of the manufacturers of the ADAS camera 10.

In a further embodiment, in addition to the NIR and/or the SWIR cameras, the automotive front vision system 4 may further comprise a Far InfraRed camera, hereinafter briefly referred to as FIR camera.

In this embodiment, the video streamings of the NIR and/or SWIR cameras and of the FIR camera are displayed in the advanced assistance mode depending on the meteorological visibility range in front of the motor-vehicle 2.

By way of a non-limiting example, the video streaming of the FIR camera could be displayed in low meteorological visibility conditions, e.g., below 30 metres, the video streaming of the SWIR camera could be displayed in medium to low meteorological visibility conditions, e.g., between 30 metres and 50 metres, and the video streaming of the NIR camera could be displayed in medium to high meteorological visibility conditions, e.g., between 80 metres and 50 metres.

Also in this embodiment, like in the previously described ones, in both the intermediate driver assistance mode and in the advanced driver assistance mode, the ECU 5 may be conveniently further programmed to enrich the displayed video streamings based on the received augmented reality data to enhance the driver's perception of the scene by depicting the elements recognised in the processed digital images, and in particular road sides, lane markers, guardrails, obstacles, other motor-vehicles, and vulnerable road users.

Also in this embodiment, the ECU 5 may conveniently be further programmed to further enrich the displayed video streaming based on data from one or different other sensors of the automotive sensory system 3 that are unaffected or only slightly affected by fog, mainly a radar, and which may hence allow obstacles that are undetectable based on the digital images from the automotive front vision system 4 to be recognised, as well as based on data contained in stored high-definition digital road maps, which may for example allow curves or lane markers to be more precisely detected.

Furthermore, also in this embodiment, like in the previously described ones, both in the intermediate driver assistance mode and in the advanced driver assistance mode, the ECU 5 may be further programmed to cause a display of the motor-vehicle 2 to display, instead of the video streamings of the automotive front vision system 4, a virtual depiction of the environment in front of or surrounding the motor-vehicle 2 (road, guardrails, obstacles, etc.) computed based on information from the automotive sensory system 3, and in particular from those sensors that are unaffected by fog, mainly a radar.

In all the different embodiments described above, the meteorological visibility ranges based on which the video streamings of the different cameras of the automotive vision system 4 are displayed may be manually user-settable via the automotive user interface 8.

Finally, in all the different embodiments described above, the video streamings to be displayed from time to time on an automotive display of the automotive user interface 8 based on the meteorological visibility range in front of the motor-vehicle 2 may be selected by the ECU 5 or by different electronic processing resources either by keeping all the front cameras 10, 11, 12 of the automotive front vision system 4 always operational and thus selecting from time to time the video streamings to be displayed based on the meteorological visibility range in front of the motor-vehicle 2, or by selectively operating only the front cameras 10, 11, 12 of the automotive front vision system 4 that are to output the video streaming to be displayed based on the meteorological visibility range in front of the motor-vehicle 2.

Based on what has been described above, the advantages that the present invention allows to achieve may be appreciated.

In particular, the present invention provides an ADAS capable of timely assisting drivers of motor-vehicles in low meteorological visibility conditions, thus contributing significantly to improving the driving safety conditions of the motor-vehicles and their passengers.

The invention claimed is:

1. An advanced driver assistance system (ADAS) configured to assist a driver of a motor-vehicle in low meteorological visibility conditions, in particular with fog;

the ADAS comprising:
an automotive sensory system comprising an automotive front vision system arranged on the motor-vehicle to monitor an environment in front of the motor-vehicle and comprising one or more first automotive front cameras designed configured to operate in the electromagnetic spectrum visible to the human eye, and one or more second automotive front cameras configured to operate in the electromagnetic spectrum invisible to the human eye; and
automotive electronic processing resources communicatively coupled to the automotive sensory system to receive and process outputs of one or more of the automotive front cameras to determine meteorological visibility in front of the motor-vehicle and assist the driver of the motor-vehicle based on the meteorological visibility in front of the motor-vehicle;
assisting the driver of the motor-vehicle comprises controlling operation(s) of one or more automotive systems comprising an automotive external lighting system, an automotive user interface and an automotive cruise control system based on the meteorological visibility in front of the motor-vehicle;
assisting the driver of the motor-vehicle further comprises visually assisting the driver of the motor-vehicle via the automotive user interface by displaying on at least one automotive display thereof a video streaming of the one or more first automotive front cameras, the one or more second automotive front cameras, or a virtual depiction of an environment in front of or surrounding the motor-vehicle computed based on information from the automotive sensory system;
the automotive electronic processing resources are further programmed to:
select, based on the meteorological visibility in front of the motor-vehicle, either a video streaming of one of the first automotive front cameras or one of the second automotive front cameras to be displayed on the automotive display of the automotive user interface; and
cause the selected video streaming or the video streaming of the selected automotive front camera to be displayed on the automotive display of the automotive user interface;
wherein the automotive electronic processing resources are further configured to assist the driver of the motor-vehicle according to at least two different driver assistance modes comprising:
a first driver assistance mode, if the meteorological visibility in front of the motor-vehicle is within a first meteorological visibility range; and
a second driver assistance mode, if the meteorological visibility in front of the motor-vehicle is within a second meteorological visibility range lower than the first meteorological visibility range;
in the second driver assistance mode, the automotive electronic processing resources are further programmed to visually assist the driver of the motor-vehicle via at least one automotive display of the automotive user interface, on which either a video streaming of one of the second automotive front cameras or the virtual depiction of the environment in front of or surrounding the motor-vehicle computed based on information from the automotive sensory system is displayed.

2. The ADAS of claim 1, wherein the one or more different first automotive front cameras comprise:

an ADAS camera designed to allow camera-based ADAS functions to be implemented and to output a video streaming; or
an ADAS camera designed to allow only camera-based ADAS functions to be implemented, but not to output a video streaming, and an additional camera designed to operate in the electromagnetic spectrum visible to the human eye and to output a video streaming;
the one or the more second automotive front cameras comprise one or of more of:
a Near InfraRed (NIR) camera;
a Short-Wavelength InfraRed (SWIR) camera; and
a Far InfraRed (FIR) camera.

3. The ADAS of claim 2, wherein the automotive electronic processing resources are further designed to process an output of one or more of the first automotive front cameras, one or more of the second automotive front cameras, and/or outputs of other sensors of the automotive sensory system to recognise elements including lane markers, guardrails, obstacles, motor-vehicles, and vulnerable road users and to output augmented reality data representative of the recognised elements;
the automotive processing electronic resources are further programmed to enrich the displayed video streaming based on the augmented reality data, by displaying the recognised elements.

4. The ADAS of claim 1, wherein the automotive electronic processing resources are further programmed to:
in the first driver assistance mode:
switch off front and rear fog lights of the motor-vehicle,
enable manual or automatic switching on of high beam headlights of the motor-vehicle,
enable automatic switching on of low beam headlights of the motor-vehicle,
interrupt any previous visual, acoustic, or haptic warning of low meteorological visibility to the driver, and
remove any limitation to a user-settable cruise speed of the automotive cruise control system of the motor-vehicle; and
in the second driver assistance mode:
switch on the front and rear fog lights of the motor-vehicle,
switch off the high beam headlights of the motor-vehicle and disable automatic switching on thereof,
switch on the low beam headlights of the motor-vehicle and disable automatic switching off thereof,
provide at least one of a visual, acoustic, and haptic warning of low meteorological visibility to the driver, and
limit the maximum user-settable cruise speed of the automotive cruise control system of the motor-vehicle so that a safety cruising speed cannot be exceeded.

5. The ADAS of claim 1, wherein, in the second driver assistance mode, the automotive electronic processing resources are further programmed to prevent a driving speed of the motor-vehicle from exceeding a safety driving speed by implementing one or more of the following interventions:
recommending the driver to adopt the safety driving speed via the automotive user interface of the motor-vehicle,
at least one of visually, acoustically, and haptically requesting the driver via the automotive user interface of the motor-vehicle to intervene on controls of the motor-vehicle, and
intervening on automotive systems of the motor-vehicle 2.

6. The ADAS of claim 1, wherein the automotive electronic processing resources are further programmed to assist the driver of the motor-vehicle according to three different driver assistance modes comprising:
- a first driver assistance mode, if the meteorological visibility in front of the motor-vehicle is within a first meteorological visibility range,
- a second driver assistance mode, if the meteorological visibility in front of the motor-vehicle is within a second meteorological visibility range lower than the first meteorological visibility range; and
- a third driver assistance mode, if the meteorological visibility in front of the motor-vehicle is within a third meteorological visibility range lower than the second meteorological visibility range;
- in the second driver assistance mode, the automotive electronic processing resources are further programmed to visually assist the driver of the motor-vehicle via at least one automotive display of the automotive user interface, on which either the video streaming of one of the first automotive front cameras or the virtual depiction of the environment in front of or surrounding the motor-vehicle computed based on information from the automotive sensory system is displayed;
- in the third driver assistance mode, the automotive electronic processing resources are further programmed to visually assist the driver of the motor-vehicle via at least one automotive display, on which either the video streaming from one of the second automotive front cameras or the virtual depiction of the environment in front of or surrounding the motor-vehicle computed based on information from the automotive sensory system is displayed.

7. The ADAS of claim 6, wherein the automotive electronic processing resources are further programmed to:
- in the first driver assistance mode:
  - switch off front and rear fog lights of the motor-vehicle,
  - enable manual or automatic switching on of high beam headlights of the motor-vehicle,
  - enable automatic switching on of the low beam headlights of the motor-vehicle,
  - interrupt any previous visual/acoustic/aptic warning of low meteorological visibility to the driver, and
  - remove any limitation to the user-settable cruise speed of the automotive cruise control system of the motor-vehicle;
- in the second driver assistance mode:
  - switch off the front and rear fog lights of the motor-vehicle,
  - switch off the high beam headlights of the motor-vehicle and disable automatic switching on thereof,
  - switch on the low beam headlights of the motor-vehicle and disable automatic switching off thereof,
  - provide at least one of a visual, acoustic, and haptic warning of low meteorological visibility to the driver, and
  - remove any limitation to the user-settable cruise speed of the automotive cruise control system of the motor-vehicle; and
- in the third driver assistance mode:
  - switch on the front and rear fog lights of the motor-vehicle,
  - switch off the high beam headlights of the motor-vehicle and disable automatic switching on thereof,
  - switch on the low beam headlights of the motor-vehicle and disable automatic switching off thereof,
  - provide at least one of a visual, acoustic, and haptic warning of low meteorological visibility to the driver, and
  - limit the maximum user-settable cruise speed of the automotive cruise control system of the motor-vehicle so that a safety cruising speed cannot be exceeded.

8. The ADAS of claim 6, wherein, in the second and third driver assistance modes, the automotive electronic processing resources are further programmed to prevent a driving speed of the motor-vehicle from exceeding a safe driving speed by implementing one or more of the following interventions:
- recommending the driver to adopt a safety driving speed via the automotive user interface of the motor-vehicle,
- at least one of visually, acoustically, and haptically requesting the driver via the automotive user interface of the motor-vehicle to intervene on the controls of the motor-vehicle, and
- intervening on the automotive systems of the motor-vehicle.

9. An advanced driver assistance system (ADAS) configured to assist a driver of a motor-vehicle in low meteorological visibility conditions, in particular with fog; the ADAS comprising:
- an automotive sensory system comprising an automotive front vision system arranged on the motor-vehicle to monitor an environment in front of the motor-vehicle and comprising one or more first automotive front cameras configured to operate in an electromagnetic spectrum visible to the human eye, and one or more second automotive front cameras configured to operate in the electromagnetic spectrum invisible to the human eye; and
- automotive electronic processing resources communicatively coupled to the automotive sensory system to receive and process outputs of one or more of the automotive front cameras to determine meteorological visibility in front of the motor-vehicle and assist the driver of the motor-vehicle based on the meteorological visibility in front of the motor-vehicle;
- assisting the driver of the motor-vehicle comprises controlling operation(s) of one or more automotive systems comprising an automotive external lighting system, an automotive user interface and an automotive cruise control system based on the meteorological visibility in front of the motor-vehicle;
- assisting the driver of the motor-vehicle further comprises visually assisting the driver of the motor-vehicle via the automotive user interface by displaying on at least one automotive display thereof a video streaming of the one or more first automotive front cameras, the one or more second automotive front cameras, or a virtual depiction of an environment in front of or surrounding the motor-vehicle computed based on information from the automotive sensory system;
- the automotive electronic processing resources are further programmed to:
  - select, based on the meteorological visibility in front of the motor-vehicle, either a video streaming of one of the first automotive front cameras or one of the second automotive front cameras to be displayed on the automotive display of the automotive user interface; and cause the selected video streaming or the video streaming of the selected automotive front camera to be displayed on the automotive display of the automotive user interface;

wherein the automotive electronic processing resources are further programmed to assist the driver of the motor-vehicle according to three different driver assistance modes comprising:
- a first driver assistance mode, if the meteorological visibility in front of the motor-vehicle is within a first meteorological visibility range,
- a second driver assistance mode, if the meteorological visibility in front of the motor-vehicle is within a second meteorological visibility range lower than the first meteorological visibility range; and
- a third driver assistance mode, if the meteorological visibility in front of the motor-vehicle is within a third meteorological visibility range lower than the second meteorological visibility range;
- in the second driver assistance mode, the automotive electronic processing resources are further programmed to visually assist the driver of the motor-vehicle via at least one automotive display of the automotive user interface, on which either the video streaming of one of the first automotive front cameras or the virtual depiction of the environment in front of or surrounding the motor-vehicle computed based on information from the automotive sensory system is displayed;
- in the third driver assistance mode, the automotive electronic processing resources are further programmed to visually assist the driver of the motor-vehicle via at least one automotive display, on which either the video streaming from one of the second automotive front cameras or the virtual depiction of the environment in front of or surrounding the motor-vehicle computed based on information from the automotive sensory system is displayed.

* * * * *